US005902440A

United States Patent [19]

Jenkins

[11] Patent Number: 5,902,440

[45] Date of Patent: May 11, 1999

[54] METHOD FOR MAKING LABELS

[76] Inventor: Peter G. Jenkins, Elyria, Ohio

[21] Appl. No.: 08/909,568

[22] Filed: Aug. 12, 1997

[51] Int. Cl.[6] .......... B32B 31/00

[52] U.S. Cl. .......... 156/257; 156/230; 156/239; 156/264; 156/265; 156/267; 156/268; 156/299; 283/81; 283/101

[58] Field of Search .......... 156/230, 235, 156/239, 257, 256, 263, 268, 299, 297, 234, 249, 240, 541, 540, 264, 267, 265; 283/81, 101; 428/42.1, 41.8

[56] References Cited

U.S. PATENT DOCUMENTS

| | | | |
|---|---|---|---|
| 2,391,539 | 12/1945 | Avery | 156/259 |
| 4,612,076 | 9/1986 | Moss | 156/249 |
| 4,977,006 | 12/1990 | Smith et al. | 428/42 |
| 5,486,254 | 1/1996 | Gallagher et al. | 156/229 |

*Primary Examiner*—David A. Simmons
*Assistant Examiner*—Linda L. Gray
*Attorney, Agent, or Firm*—Renner, Kenner, Greive, Bobak, Taylor & Weber

[57] ABSTRACT

A method for making paper labels having a protective covering where a paper sheet, adhesively supported on a first release backing sheet, is first die cut to form an array of labels. A second release backing sheet is provided having adhesively attached thereto, by an adhesive, an array of transparent cover strips. The second release backing sheet is divided into first and second portions. The second release backing sheet is then placed on the die cut paper sheet where the second release backing sheet is between the cover strips and the labels. The first portion of the second release backing sheet is then removed from the cover strips to expose a portion of the cover strips, and the exposed portion of the cover strips are then adhered to corresponding portions of the labels using the adhesive. The second portion of the second release backing sheet is then removed from the cover strips to expose a remaining portion of the cover strips, and the remaining portion of the cover strips are then adhered to corresponding portions of the labels using the adhesive. During removal of the first portion of the second release backing sheet, the second portion of the second release backing sheet is secured with the die cut paper sheet.

3 Claims, 3 Drawing Sheets

METHOD FOR MAKING LABELS

TECHNICAL FIELD

The invention herein resides in the art of the preparation of pressure sensitive adhesive labels for attachment to file folders. More particularly, the invention relates to a method for manually making such labels of paper and subsequently covering the paper label with a clear protective sheet. Specifically, the invention relates to a method for generating a sheet of paper labels and thereafter simultaneously covering each of the labels of the sheet with a protective vinyl cover.

BACKGROUND ART

Presently, many businesses employ large volumes of file folders in which information regarding clients, customers, or patients is maintained. File folders are continually added to and deleted from the file system as the need arises. When the file system is first established, the preparation of labels for the files is easily achieved using automated equipment accommodating data entry, printing of the data onto a label, and the subsequent lamination of a protective cover over the labels. Automated equipment for such purpose is well known. However, when files are to be added to the system on a periodic basis, there is a need for a methodology which may be employed on site for preparation of the file labels with protective covers. Generally, the volume of new files being generated on site at various businesses does not warrant the cost of automated equipment for label preparation. Consequently, there is a need for a methodology by which pressure sensitive adhesive backed paper labels may be prepared on site, and subsequently be laminated with a protective clear cover sheet prior to application of the label to a file folder. While individual paper labels and corresponding individual vinyl strips have previously been known for such purpose, the methodology for applying the clear vinyl strips to the paper labels in the past has generally been a difficult and frustrating experience, given to failure and waste. The protective vinyl strips are generally difficult to handle and to position upon the labels.

In light of the foregoing, there is a need in the art for a methodology by which pressure sensitive adhesive paper labels may be prepared and subsequently receive a clear vinyl plastic strip thereover. There is a particular need in the art for a methodology which accommodates the development of such labels in a time and cost effective manner.

DISCLOSURE OF INVENTION

In light of the foregoing, it is a first aspect of the invention to provide a method for manually generating paper labels and applying a protective sheet thereover.

Another aspect of the invention is the provision of a method for making labels by which a full sheet of a plurality of labels having protective covers thereover can be manually generated at the same time.

A further aspect of the invention is the provision of a method for making labels in which a protective cover is applied to the face of the paper label while the paper label remains upon a firm carrier sheet.

Still a further aspect of the invention is the provision of a method for making labels in which paper labels having protective covers thereover may be manually developed on an as-needed basis in an efficient and effective manner.

Still another aspect of the invention is to provide a method for making labels having protective covers thereover which is easy to implement, employing state of the art paper label and protective cover stock.

The foregoing and other aspect of the invention which will become apparent as the detailed description proceeds are achieved by a method for preparing labels with protective covers, comprising: forming an array of labels in a first sheet; forming an array of label covers on a second sheet; imparting information onto a face of each of said labels of said array of labels; and simultaneously transferring said array of label covers from said second sheet onto said array of labels in said first sheet.

Other aspects of the invention which will become apparent herein are attained by a method for making paper labels with protective transparent covers, comprising: die cutting an array of labels in a paper sheet, said paper sheet being adhesively attached to a first release backing sheet; providing an array of transparent cover strips on a second release backing sheet, said second release backing sheet being divided into first and second portions; placing said second release backing sheet carrying said transparent cover strips upon said paper sheet and aligning said cover strips with respective ones of said labels; removing said first portion of said second release backing sheet from said cover strips, exposing a portion of said cover strips, and adhering said exposed portions of said cover strips to corresponding portions of said labels; and removing said second portion of said second release backing sheet from said cover strips, exposing a remaining portion of said cover strips, and adhering said remaining portions of said cover strips to corresponding remaining portions of said labels.

DESCRIPTION OF THE DRAWINGS

For a complete understanding of the objects, techniques, and structure of the invention, reference should be made to the following detailed description and accompanying drawings wherein.

BEST MODE FOR CARRYING OUT THE INVENTION

Figure 1:
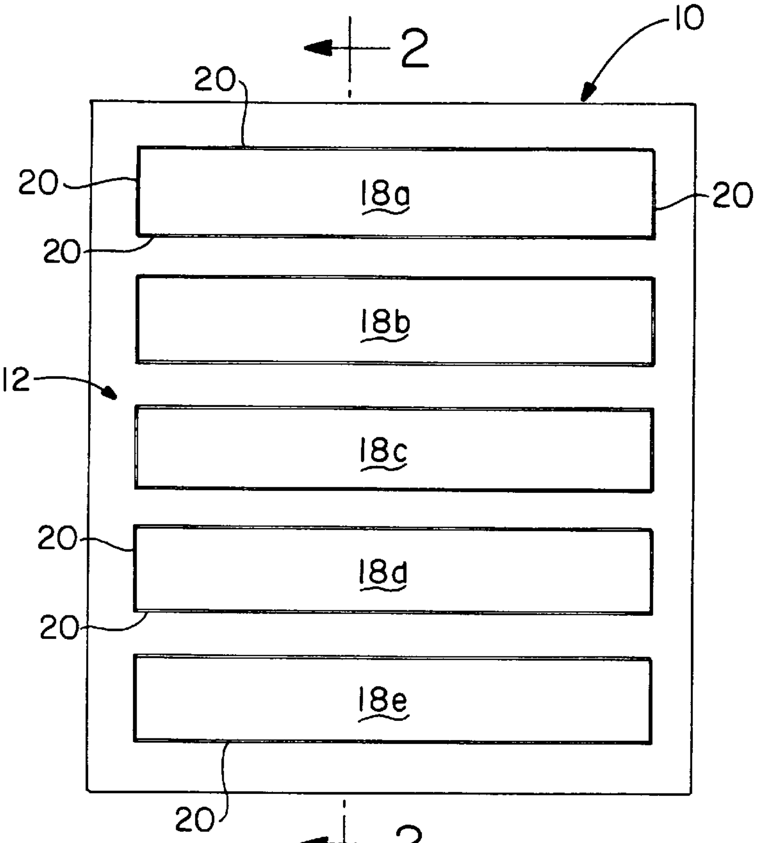
FIG. 1 is top plan view of a paper label laminate sheet according to the invention.
Figure 2:
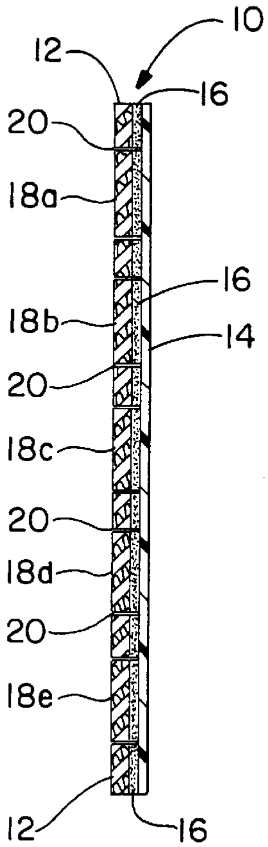
FIG. 2 is cross sectional view of the sheet of FIG. 1 taken along the line 2—2.

Referring now to the drawings and more particularly to FIGS. 1 and 2, it can be seen that a sheet of paper label laminates is designated generally by the numeral 10. The sheet 10 includes a face sheet 12, typically of paper or the like. According to the preferring embodiment of the invention, the face sheet 12 is of a material adapted for easily receiving typed, printed, or hand written indicia. In this regard, a paper stock serves quite well. A backing sheet 14 is adhered to the back of the face sheet 12 by means of a layer of pressure sensitive adhesive 16. Those skilled in the art will realize that the backing sheet 14 comprises what is generally termed a release liner, being silicone coated on the side thereof engaging the adhesive layer 16.

A series of labels 18*a*–18*e* are die cut into the face sheet 12, as at 20. The die cut perimeters 20 of the labels 18*a*–18*e* are preferably through the full thickness of the face sheet 12 and into or through the adhesive layer 16 to the silicone coated face of the release liner 14. Accordingly, each of the labels 18*a*–18*e* may be separately removed from the sheet 10 so as to individually comprise an adhesive-backed label.

Figure 3:
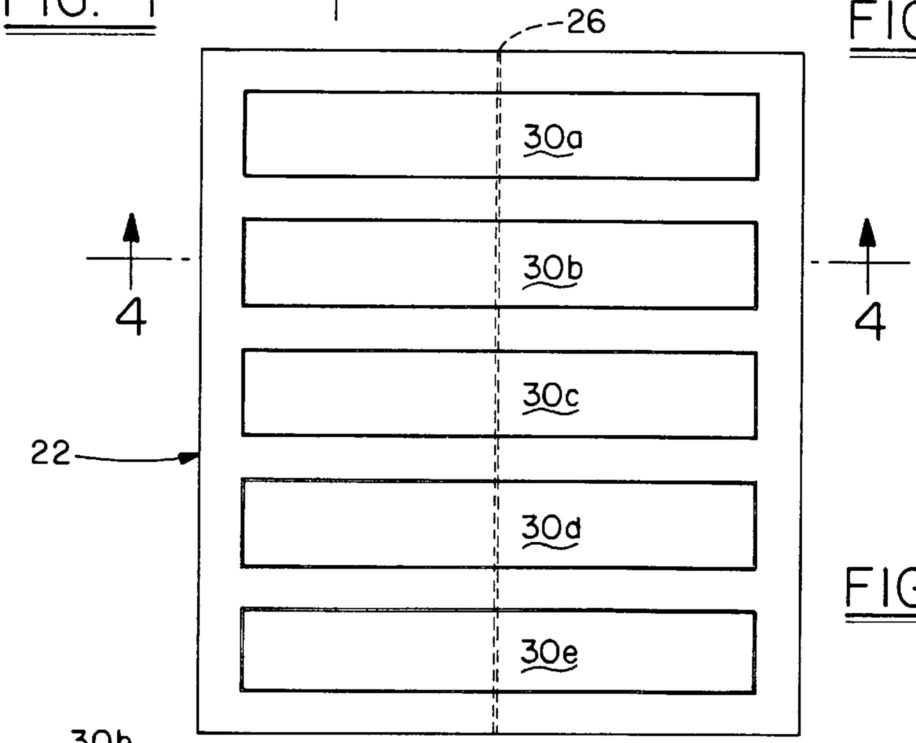
FIG. 3 is a top plan view of a sheet of cover strips as employed by the invention.
Figure 4:
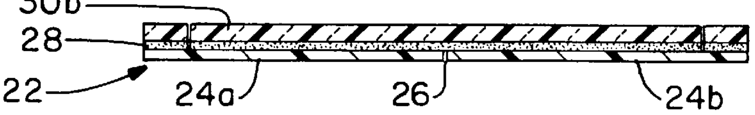
FIG. 4 is a cross sectional view of the sheet of cover strips of FIG. 3, taken along the line 4—4.

With reference to FIGS. 3 and 4, it can be seen that a sheet of cover strip laminates is designated generally by the numeral 22. The sheet 22 includes a backing sheet of two sections 24*a* and 24*b*, separated by a split 26 passing therethrough. The backing sheet sections 24*a*, 24*b* are silicone coated and comprise a release liner to which is attached a pressure sensitive adhesive layer 28 of each of a plurality of die cut clear vinyl label covers 30*a*–30*e*. It will be appreciated that the vinyl label covers 30*a*–30*e* are die cut into a vinyl sheet which is adhesively secured by the adhesive layer 28 to the silicone coated surface of the release liner 24*a*, 24*b*. The vinyl sheet is then "weeded" or removed from the backing sheet 24*a*, 24*b* such that the clear vinyl label covers 30*a*–30*e* remain. Accordingly, the split backing sheet 24*a*, 24*b* adhesively maintains thereon a plurality of clear vinyl label covers 30*a*–30*e*, each such label cover being adhesively backed.

In accordance with the invention, the sheets 10 and 22 are of equal size and the label covers 30*a*–30*e* are die cut with an identical die to that which forms the labels 18*a*–18*e*. Accordingly, when the sheet 22 is overlayed upon the sheet 10, the clear vinyl label covers 30*a*–30*e* overlie respective paper labels 18*a*–18*e*. In other words, the sheets 10 and 22 are congruent, as are the configurations, placement, and spacing of the label covers 30*a*–30*e* and the labels 18*a*–18*e*.

In accordance with the invention, when a series of labels is to be prepared as for attachment to the edges of file folders or the like, relevant data 32 may be entered upon each of the faces of the paper labels 18*a*–18*e* by any appropriate means, such as hand writing, typewriter, thermal printer, or the like. With a sheet 10 of labels 18*a*–18*e* having been so prepared, protective cover strips 30*a*–30*e* may be adhered thereover in a manner which can best be appreciated by references to FIGS. 5–8.

Figure 6:
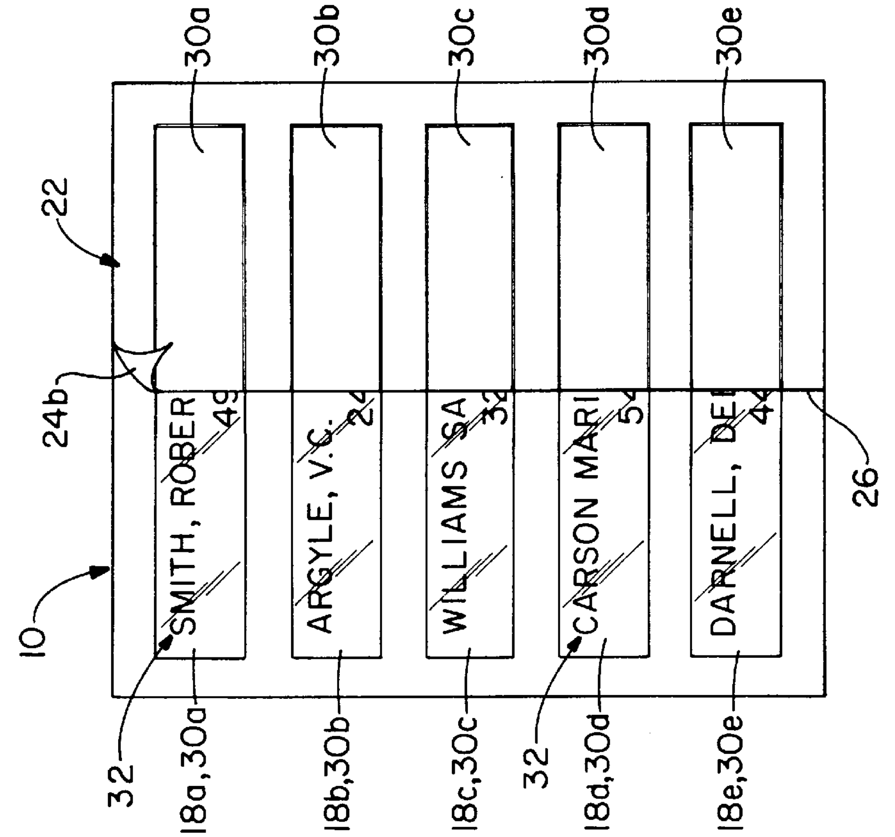
FIG. 6 is an illustration of a midpoint in the process of transferring cover strips to labels, in which one half of each of the labels is covered by a cover strip.
Figure 5:
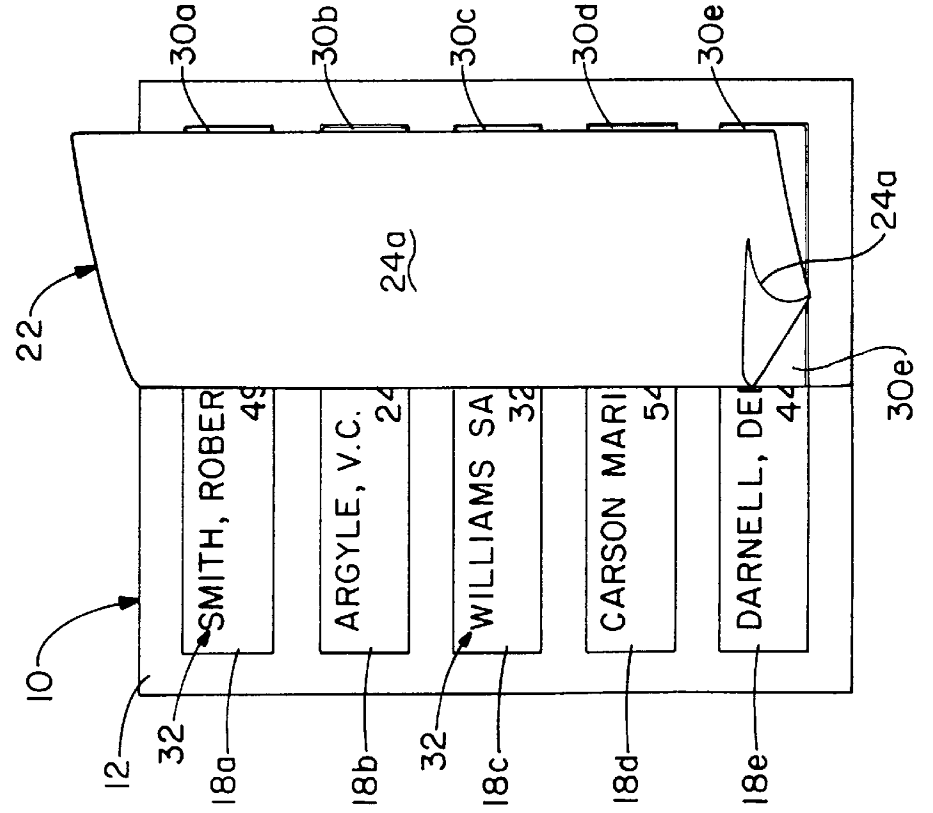
FIG. 5 is an illustration of a first part of the process of transferring cover strips from the sheet of cover strips of FIG. 3 to the labels of the sheet of labels of FIG. 1.

A sheet 10, having paper labels 18*a*–18*e* with data printed thereon is first covered with a sheet 22 of cover strips 30*a*–30*e*. The split backing sheet 24*a*, 24*b* is placed upon the top of the sheet 10 and over the face sheet 12 having the labels 18*a*–18*e* therein. The sheets 10, 22 are brought into congruent alignment with each other, such that the cover strips 30*a*–30*e* directly overlie respective labels 18*a*–18*e*. With the sheet 22 fixedly secured to the sheet 10, the sheet 22 is folded backwardly along the split 26, as best shown in FIG. 5. Half of the backing sheet 24*a* is then removed, beginning at the split 26, and pulled toward the left as shown in FIG. 5, such that the left half of each of the clear vinyl label covers 30*a*–30*e* is transferred from the backing sheet 24*a* and onto the face of the left side of the associated label 18*a*–18*e*, with the resulting structure being as shown in FIG. 6. Here, the backing sheet 24*a* has been totally removed and the left half of each of the vinyl label covers 30*a*–30*e* has been adhesively secured to the face of an associated label 18*a*–8*e*. The clear adhesive 28 makes the secured engagement.

Figure 8:
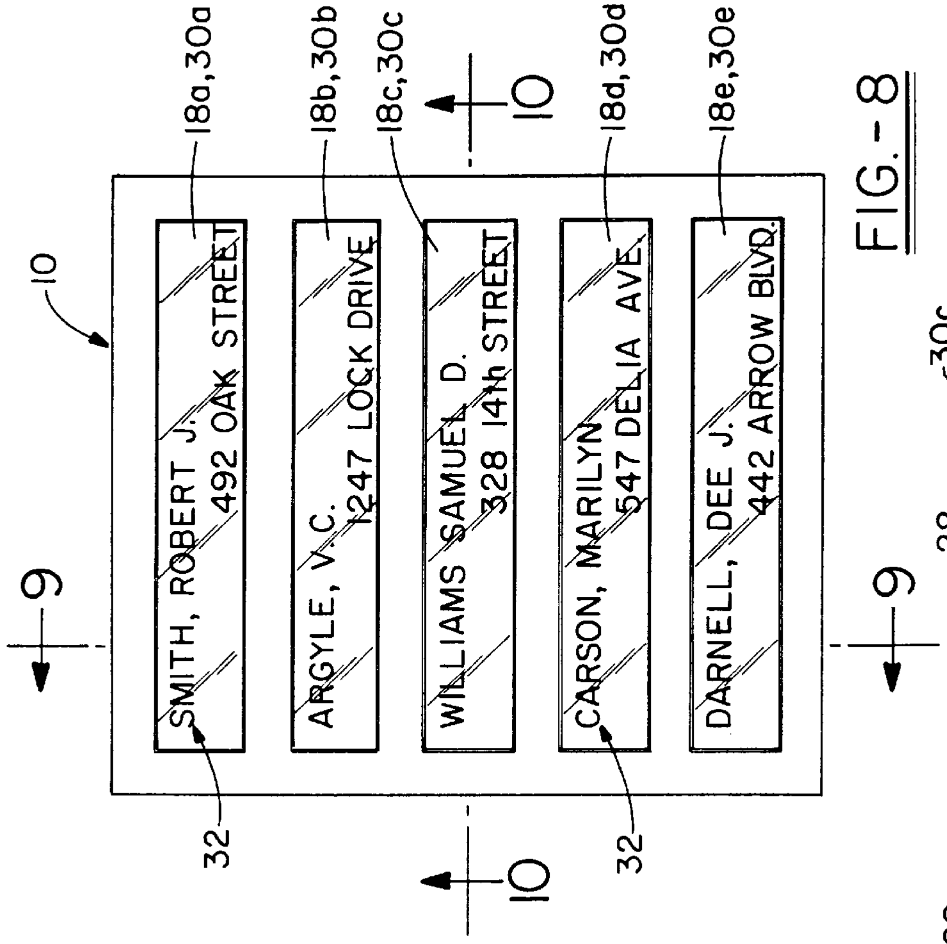
FIG. 8 is an illustration of a sheet of labels having laminated cover strips thereon in accordance with the invention.
Figure 7:
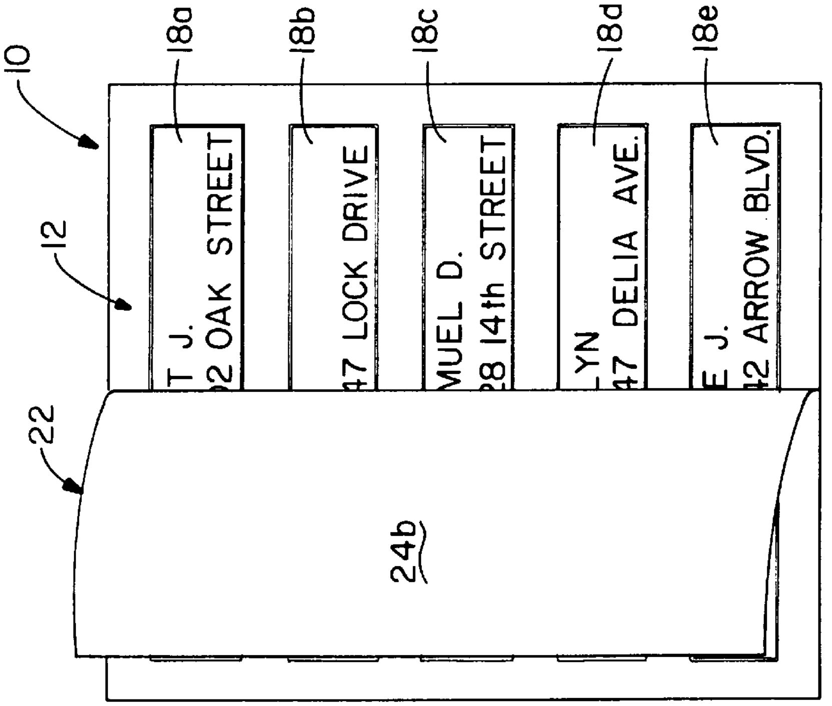
FIG. 7 is an illustration of a second step in completing the transfer of cover strips to labels according to the invention.

Next, the sheet 22 is folded to the left, as shown in FIG. 7, such that the backing sheet 24*b* can be secured as at along the split 26 and pulled to the right such that the right half of each of the clear strips 30*a*–30*e* is "walked" onto the right half of the associated labels 18*a*–18*e*. The resultant structure is now as shown in FIG. 8. The sheet 10 now contains a plurality of die cut labels 18*a*–18*e* with data carried on the face thereof, and with the face of each of the labels being covered by a clear vinyl strip. The labels may then be individually removed from the sheet 10 and adhered as by the adhesive 16 to a file folder or the like.

Figure 10:
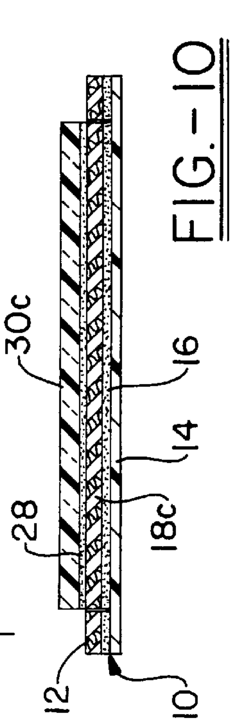
FIG. 10 is a cross sectional view of the sheet of FIG. 8 taken along the line 10—10.
Figure 9:
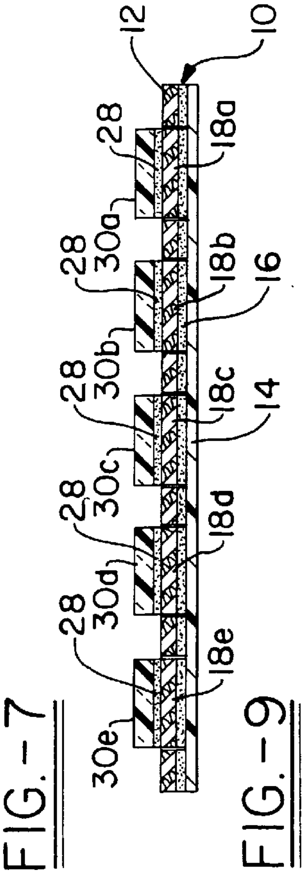
FIG. 9 is a cross sectional view of the sheet of FIG. 8 taken along the line 9—9.

As shown in FIGS. 9 and 10, each of the labels carried by the sheet 10 now includes a clear vinyl cover 30*a*–30*e* adhesively attached as by a clear adhesive 28 to the face of an associated label 18*a*–18*e*, each such label strip having adhesive 16 on the back thereof.

It should thus be appreciated that the concept of the invention allows for the generation of a sheet of labels at the point at which the labels are to be used, and in which each of the labels of the sheet may receive a clear plastic vinyl cover thereover. Each such label thus comprises a laminate with the data thereon protected by an adhesive strip and which may be adhesively attached to an appropriate file folder or the like. The labels may be generated by hand, eliminating the need for expensive processing equipment.

Thus it can be seen that the objects of the invention have been satisfied by the structure presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention, references should be made to the following claims.

What is claimed is:

1. A method for making paper labels with protective transparent covers, comprising:

die cutting an array of labels in a paper sheet, said paper sheet being adhesively attached to a first release backing sheet;

providing an array of transparent cover strips attached to a second release backing sheet by an adhesive, said second release backing sheet being split therethrough to form first and second portions;

placing said second release backing sheet carrying said transparent cover strips upon said paper sheet and aligning said cover strips with respective ones of said labels, said second release backing sheet being between the cover strips and the labels;

removing said first portion of said second release backing sheet from said cover strips, to expose a portion of said cover strips, and adhering said exposed portions of said cover strips to corresponding portions of said labels;

removing said second portion of said second release backing sheet from said cover strips, to expose a remaining portion of said cover strips, and adhering said remaining portions of said cover strips to corresponding remaining portions of said labels; and wherein said second portion of said second release backing sheet is secured with said paper sheet while said first portion of said second release backing sheet is removed from said cover strips and said exposed portions of said cover strips are secured to said corresponding portions of said labels.

2. The method of making paper labels with protective transparent covers according to claim 1, wherein said first and second release backing sheets and said paper sheet are congruent.

3. The method for making paper labels with protective transparent covers according to claim 2, wherein said arrays of labels and cover strips are aligned with each other when said second release backing sheet is placed upon said paper sheet.

* * * * *